Dec. 20, 1938.   H. WHITE   2,140,976
COASTING SLED
Filed Feb. 24, 1938   2 Sheets—Sheet 2
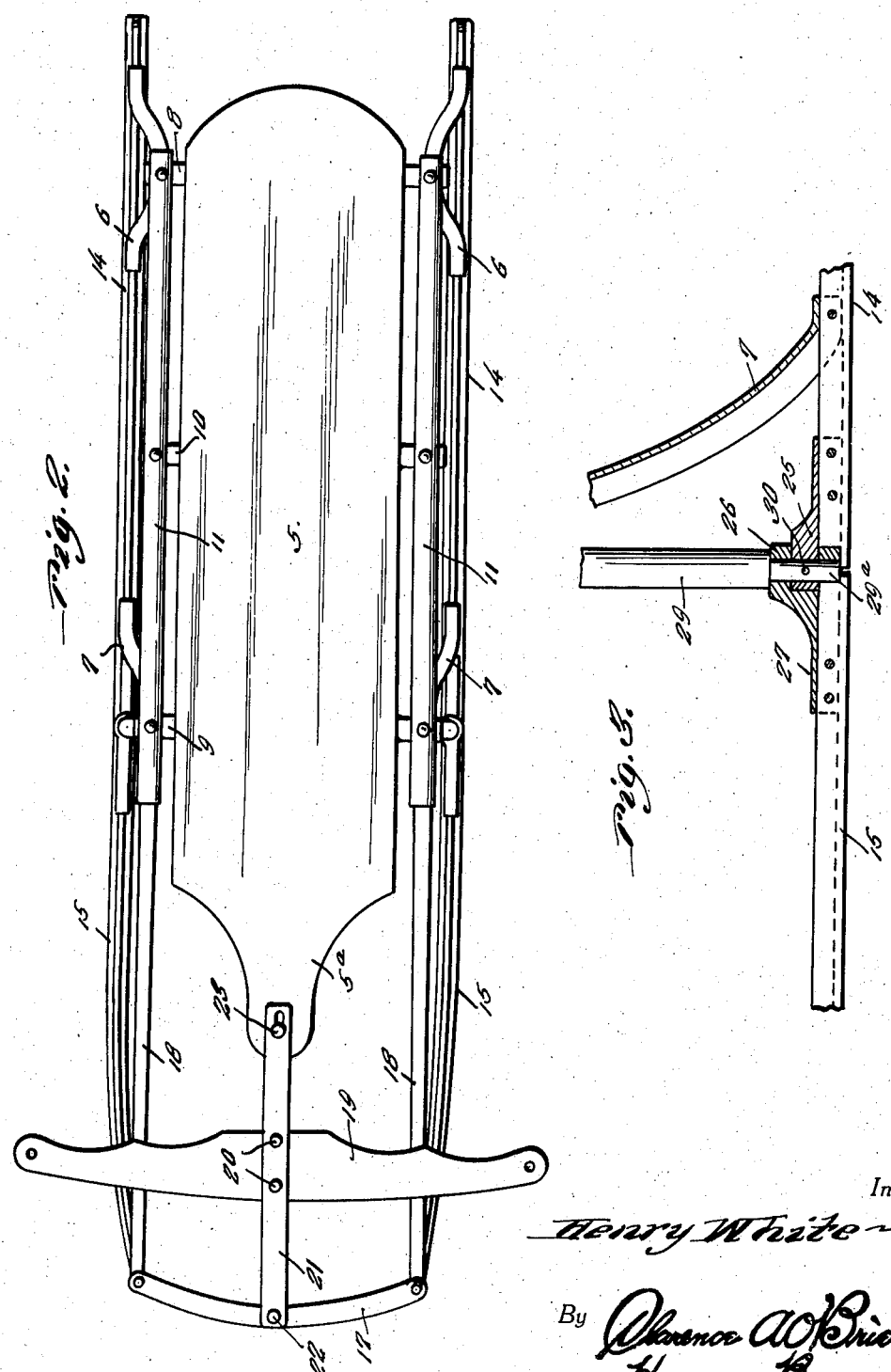
Inventor
Henry White
By Clarence A. O'Brien
Hyman Berman
Attorneys Patented Dec. 20, 1938

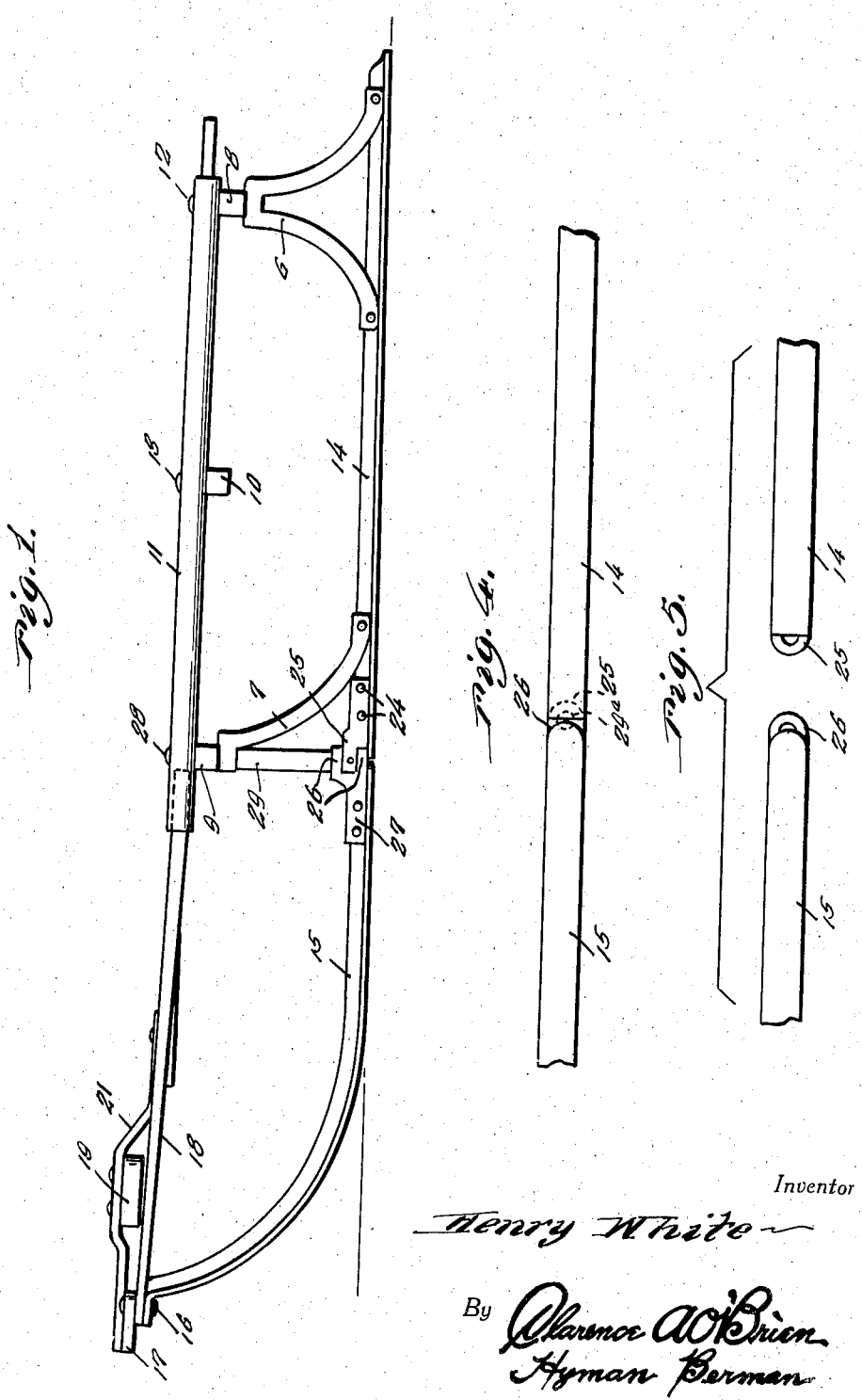

2,140,976

UNITED STATES PATENT OFFICE 2,140,976

COASTING SLED

Henry White, Waynesburg, Pa.

Application February 24, 1938, Serial No. 192,358

1 Claim. (Cl. 280—22)

This invention relates to coasting sleds and an object of the present invention is to provide an improved coasting sled of the flexible steering type.

The invention together with its objects and advantages will be best understood from a study of the following description taken in connection with the accompanying drawings wherein:—

Figure 1 is a side elevational view of a sled constructed in accordance with the present invention, Figure 2 is a top plan view thereof, Figure 3 is a fragmentary detail view partly in section and partly in elevation and showing the hinge connection between the sections of a runner, Figure 4 is a bottom plan view of a runner showing the hinge connection between the sections of the runner, and Figure 5 is a bottom plan view showing fragmentarily the two sections of the runner, with the sections separated.

Referring to the drawings it will be seen that my improved coaster sled is of the flexible steering type, and in the preferred embodiment thereof comprises a seat or platform 5 of wood or other suitable material and of substantially an edge contour common to seats or platforms. Supporting the platform 5 are rear braces 6, front braces 7, a rear cross bar 8 supported by the braces 6, a front cross bar 9 supported by the front braces 7, and an intermediate cross bar 10.

Tubular side bars 11 laterally spaced from the seat or platform 5 extend longitudinally and are supported by the cross bars 8 and 9 as shown. At the rear ends thereof the tubular side bars 11 are riveted or otherwise secured to the cross bar 8 as at 12 while the cross bar 10 at its ends is secured to intermediate portions of the side bars 11 through the medium of rivets or other fastening elements 13.

Further the sled comprises a pair of runners, and each of the runners includes a relatively fixed runner section 14 and a laterally swinging runner section 15. The laterally swinging and front runner sections 15 curve upwardly at their forward ends and have riveted or otherwise secured thereto as at 16 a curved steering distance bar 17 and also the forward ends of links 18.

The links 18 in the present instance are formed of metal and may be of tubular form in cross section. The links 18 taper longitudinally as suggested in Figure 1 and at their large ends telescopically fit within the forward ends of the tubular side bars 11 as clearly shown in Figure 1.

The wooden steering bar for the sled is indicated by the reference numeral 19, and intermediate its ends the bar 19 is riveted or otherwise secured as at 20 to a steering link 21 of metal or other suitable material. Link 21 is pivotally secured through the medium of a rivet or in any other suitable manner, and as indicated generally at 22 to the intermediate portion of the distance steering bar 17. At its rear end the steering link 21 has a lost motion connection, in the form of a pin and slot connection 23 with the forwardly extending tongue extension 5a of the platform or seat 5.

Referring now more in detail to each of the runners it will be seen that the runner section 14 of each runner has riveted or otherwise secured to the forward end thereof as at 24 a hinge ear 25 that is accommodated between a pair of vertically spaced hinge ears 26 formed integral with one end of an attaching plate 27 riveted or otherwise secured to the rear end of the front runner section 15.

The supporting post 29 has an upper reduced end extending through the upper end of the bracket 7, the cross bar 9 and a tubular side bar 11 and at said end is upset as at 28 for securing the side bar 11 on the cross bar 9 and the cross bar 9, in turn, on the upper ends of the bracket 7.

At the lower end thereof the post 29, as clearly shown in Figure 3, is provided with a reduced end 29a that acts as a hinge pin and extends through the hinge eyes 25 and 26. The hinge eye 25 is secured to the hinge pin-forming part 29a of the post 29 through the medium of a pin 30. Thus it will be seen that the hinge assembly 25, 26 is free to rotate about the hinge pin 29a as an axis.

From the description of the invention thus far it will be seen that to steer the sled to change the course thereof either to the right or left all that is necessary is to pull on the steering rod 19 in the usual manner whereupon the runner sections 15 will swing either to the right or left as the case may be, the stabilizing links or bars 18 readily flexing in the proper direction.

In actual practice it has been found that providing the links 18 in the form of spring steel rods pivoted at their forward ends to the distance steering bar 17 easy steering movement is obtained in conjunction with conventional steering bar 19 and a conventional distance steering bar 17 and steering link 21. In this connection it is also to be noted that the stabilizing bars or links 18 are flat vertically, and since they do not have to carry road shock, can be made much more flexible than the runners of the sled in the ordinary construction of such runners.

It will thus be found in actual practice that the sled will steer with ease and safety and that accordingly with a sled embodying the features of construction characterizing this invention the turns or bends of the road can be much better negotiated.

Also, notice is to be taken, as clearly shown in Figure 3, of the fact that the lower edge of the trailing runner section 14 is normally slightly elevated above the plane of the lower edge of the leading or steering runner section 15, it having been found in actual practice that such construction admits of better road performance of the sled.

If desired, the tubular side bars 11 and stabilizing links 18 may be sheathed in tubing of rubber or other suitable material thereby rendering the sled more comfortable to handle in extreme cold temperature.

It is thought that a clear understanding of the construction utility and advantages of a coasting sled embodying the features of the present invention will be had without a more detailed description thereof.

Having thus described the invention what is claimed as new is:—

In a coasting sled, a pair of opposed runners, each of said runners including sections hingedly connected together, brackets rising from one section of each runner, cross bars supported by and secured to said brackets, a platform mounted on said cross bars, said runners having front sections with upwardly curving forward ends, tubular bars mounted on said cross bars at opposite sides of said platform, stabilizing bars pivoted at the forward ends thereof to the forward ends of the last-mentioned runners, said stabilizing bars having rear ends telescopically fitting within the forward ends of said tubular side bars, a curved distance steering bar pivotally connecting the forward ends of the last-mentioned runner sections and said stabilizing links, a steering link pivotally connected at one end to the distance steering bar and having a lost motion connection at its rear end with said platform, and a manually operable steering bar secured intermediate its ends to said steering links.

HENRY WHITE.